United States Patent
Kim

(10) Patent No.: US 11,178,564 B2
(45) Date of Patent: Nov. 16, 2021

(54) METHOD AND APPARATUS FOR REPORTING MEASUREMENT RESULT

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/616,342

(22) PCT Filed: Jun. 25, 2018

(86) PCT No.: PCT/KR2018/007143
§ 371 (c)(1),
(2) Date: Nov. 22, 2019

(87) PCT Pub. No.: WO2019/004667
PCT Pub. Date: Jan. 3, 2019

(65) Prior Publication Data
US 2020/0162953 A1    May 21, 2020

Related U.S. Application Data

(60) Provisional application No. 62/525,197, filed on Jun. 27, 2017.

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04L 5/0051* (2013.01); *H04W 76/16* (2018.02); *H04W 84/20* (2013.01)

(58) Field of Classification Search
CPC ..... H04W 24/10; H04W 76/16; H04W 84/20; H04B 17/336; H04L 5/0051
(Continued)

(56) References Cited

U.S. PATENT DOCUMENTS

2010/0174561 A1* 7/2010 Moore .................. G06Q 20/10
705/3
2013/0022026 A1* 1/2013 Ishii ....................... H04L 5/001
370/332
(Continued)

FOREIGN PATENT DOCUMENTS

| AU | 2017419026 | 12/2019 |
| KR | 20170069054 | 6/2017 |
| WO | WO2018227487 | 12/2018 |

OTHER PUBLICATIONS

Samsung, "Measurement Configuration for NR SCG Addition," R2-1707103, 3GPP TSG-RAN WG2 NR#AdHoc, Qingdao, China, dated Jun. 16, 2017, 5 pages.
(Continued)

*Primary Examiner* — Danh C Le
(74) *Attorney, Agent, or Firm* — Fish & Richardson P.C.

(57) ABSTRACT

Provided are a method for a user equipment (UE) to report a measurement result in a wireless communication. The method include: receiving measurement configuration including information on a first cell of a second RAT, from a first base station of a first radio access technology (RAT); measuring the first cell and a second cell of the second RAT, based on the received measurement configuration from the first base station of the first RAT; determining whether or not to report the measurement result, based on the measurement result of the first cell and second cell of second RAT; and reporting the measurement result, to the first base station of the first RAT.

15 Claims, 11 Drawing Sheets

(51) Int. Cl.
  *H04W 76/16* (2018.01)
  *H04L 5/00* (2006.01)
  *H04W 84/20* (2009.01)

(58) Field of Classification Search
  USPC .............. 370/320, 330, 331; 455/439, 550.1, 455/552.1
  See application file for complete search history.

(56) References Cited

U.S. PATENT DOCUMENTS

| | | | |
|---|---|---|---|
| 2017/0093508 A1* | 3/2017 | Martin | H04W 24/02 |
| 2017/0150386 A1 | 5/2017 | Hoover et al. | |
| 2018/0352248 A1* | 12/2018 | Nishi | H04N 19/172 |
| 2019/0150012 A1* | 5/2019 | Tang | H04L 5/001 |
| | | | 370/252 |
| 2019/0306767 A1* | 10/2019 | Martin | H04W 24/10 |
| 2019/0349830 A1* | 11/2019 | Peisa | H04W 36/08 |
| 2020/0008119 A1* | 1/2020 | Wei | H04W 72/085 |
| 2020/0221364 A1* | 7/2020 | Zeng | H04W 48/16 |
| 2020/0280991 A1* | 9/2020 | Kim | H04W 48/12 |

OTHER PUBLICATIONS

Intel Corporation, "Inter-RAT measurement for EN DC," R2-1707048, 3GPP TSG-RAN WG2 Meeting Ad hoc, Qingdao, China, dated Jun. 17, 2017, 5 pages.

LG Electronics Inc., "Available NR frequencies in SN," R2-1706920, 3GPP TSG-RAN WG2 Ad-hoc Meeting, Qingdao, China, dated Jun. 17, 2017, 4 pages.

3rd Generation Partnership Project; Technical Specification Group Radio Access Network, "Evolved Universal Terrestrial Radio Access (E-UTRA); Radio Resource Control (RRC); Protocol specification (Release 13)", 3GPP TS 36.331 V13.1.0, Mar. 2016, 551 pages.

EP Supplementary Search Report in European Application No. EP 18822947, dated Jan. 31, 2020.

LG Electronics Inc., "Measurement report triggering events required for EN-DC", R2-1705223, 3GPP TSG-RAN WG2 Meeting #98, Hangzhou, China, May 15-19, 2017, 3 pages.

Nokia, Alcatel-Lucent Shanghai Bell, "Measurement coordination for LTE-NR tight interworking", R2-1702693, 3GPP TSG-RAN WG2 Meeting #97bis, Spokane, USA, Apr. 3-7, 2017, 5 pages.

Vivo, "On measurement event of EN-DC", R2-1706963, 3GPP TSG-RAN WG2 NR Ad Hoc, Qingdao, China, Jun. 27-29, 2017, 5 pages.

* cited by examiner

METHOD AND APPARATUS FOR REPORTING MEASUREMENT RESULT

CROSS-REFERENCE TO RELATED APPLICATIONS

This application is a National Stage application under 35 U.S.C. § 371 of International Application No. PCT/KR2018/007143, filed on Jun. 25, 2018, which claims the benefit of U.S. Provisional Application No. 62/525,197, filed on Jun. 27, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to report a measurement result and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

NG-RAN may support MR-DC operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One node may act as the master node (MN) and the other as the secondary node (SN). The MN and SN may be connected via a network interface and at least the MN is connected to the core network.

SUMMARY OF THE DISCLOSURE

Meanwhile, for radio resource management (RRM) in the EN-DC, the MN is able to trigger intra-SN change, inter-SN change, SN addition and/or SN release. Also, the SN is able to trigger intra-SN change, inter-SN change and/or SN release. In case of the MR-DC, existing event B1 (i.e. Inter RAT neighbour becomes better than threshold) may be used for SN addition triggered by the MN, but it is not suitable for the SN release or SN change triggered by the MN. Namely, in case of the MR-DC, there is no suitable event to support SN release or SN change triggered by the MN. Therefore, in case of the MR-DC, events for supporting SN release or SN change need to be proposed.

One embodiment provides a method for reporting, by a user equipment (UE), a measurement result in a wireless communication. The method may include: receiving measurement configuration including information on a first cell of a second RAT, from a first base station of a first radio access technology (RAT); measuring the first cell and a second cell of the second RAT, based on the received measurement configuration from the first base station of the first RAT; determining whether or not to report the measurement result, based on the measurement result of the first cell and second cell of second RAT; and reporting the measurement result, to the first base station of the first RAT.

Another embodiment provides a user equipment (UE) reporting a measurement result in a wireless communication. The UE may include: a memory; a transceiver; and a processor, connected to the memory and the transceiver, that: controls the transceiver to receive measurement configuration including information on a first cell of a second RAT, from a first base station of a first radio access technology (RAT); measures the first cell and a second cell of the second RAT, based on the received measurement configuration from the first base station of the first RAT; determines whether or not to report the measurement result, based on the measurement result of the first cell and second cell of second RAT; and controls the transceiver to report the measurement result, to the first base station of the first RAT.

In case of EN-DC or NE-DC, secondary node can be changed or released.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
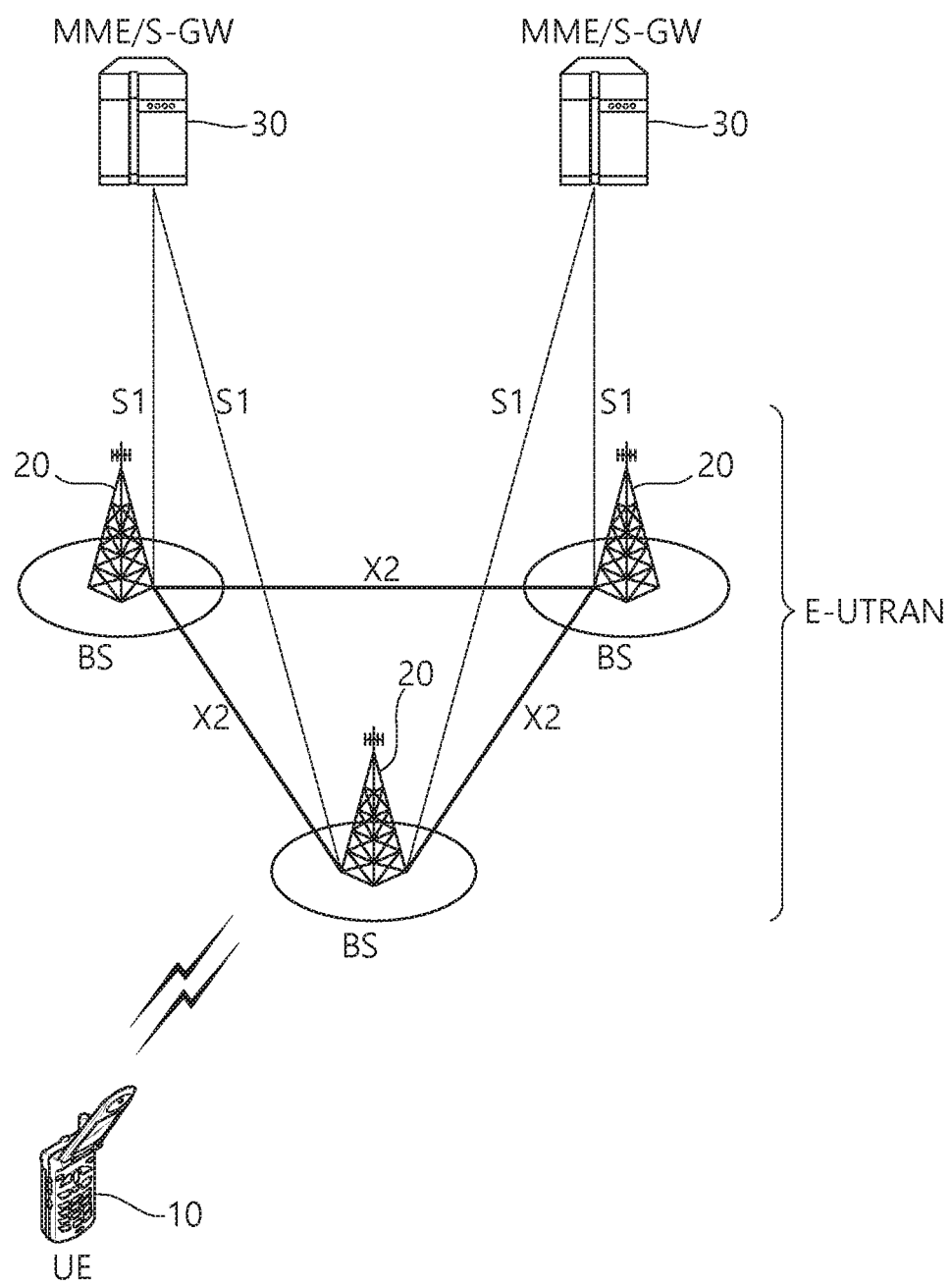
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
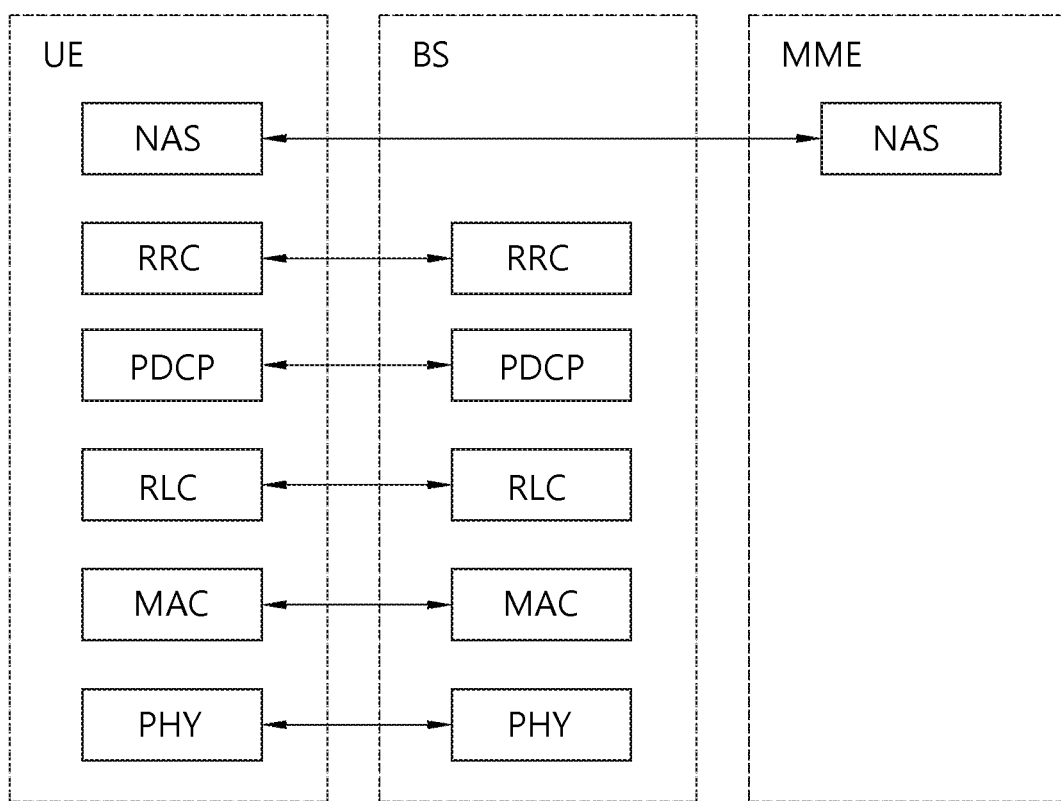
FIG. 2 shows a control plane of a radio interface protocol of an LTE system.
Figure 3:
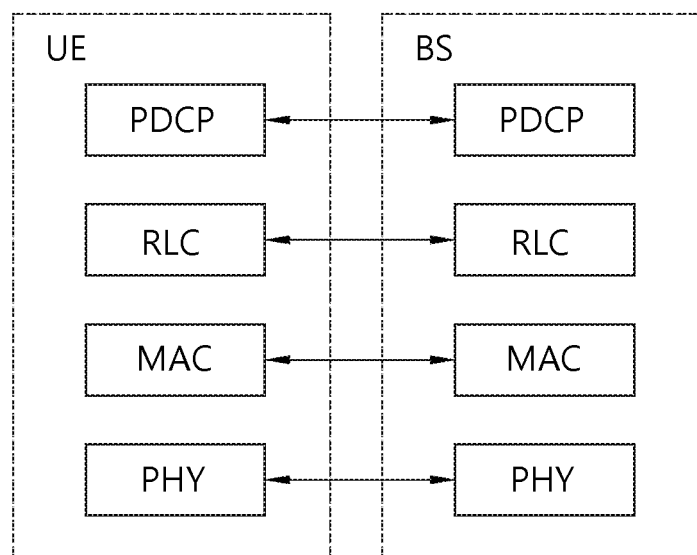
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARM) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARD). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
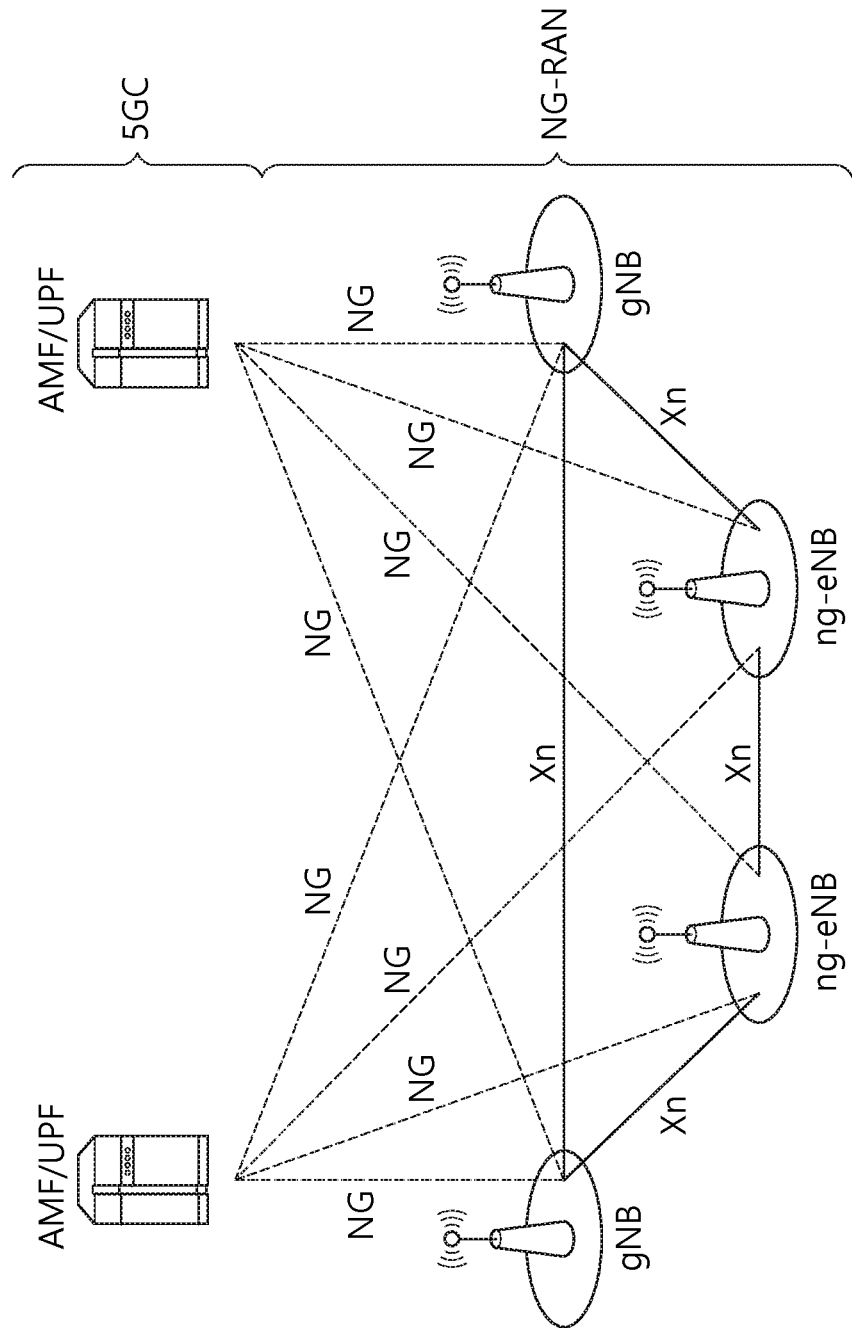
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
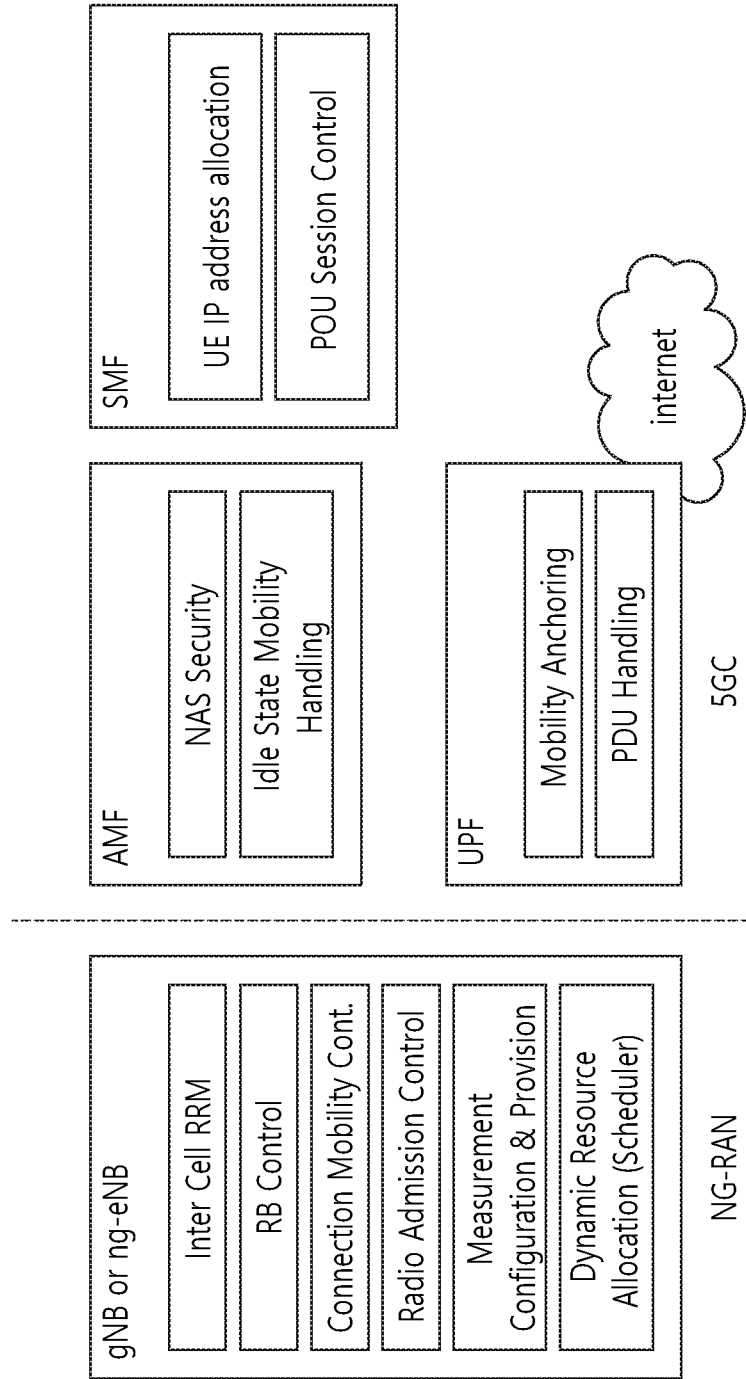
FIG. 5 shows functional split between NG-RAN and 5GC.

FIG. 5 shows functional split between NG-RAN and 5GC.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:

NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, measurements of LTE system are described.

Figure 6:
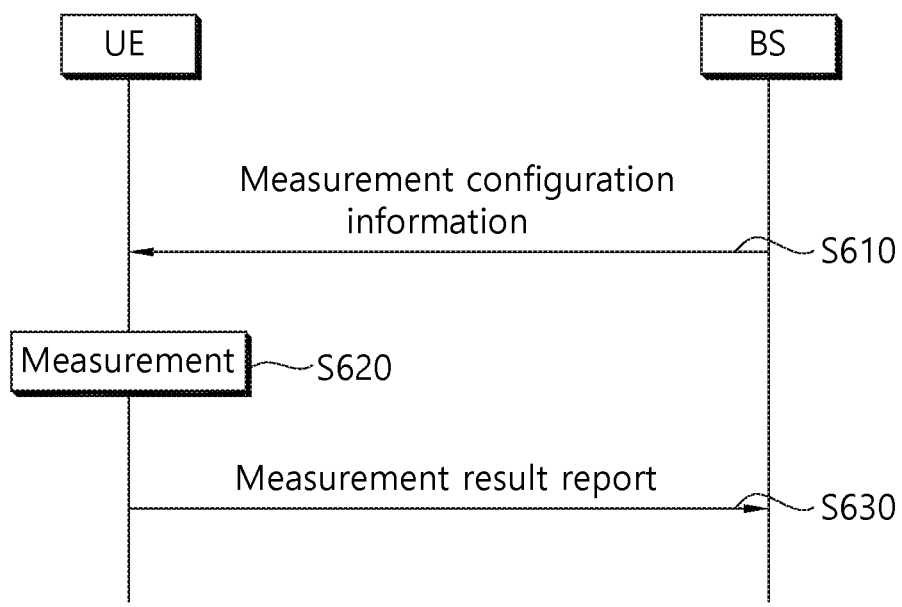
FIG. 6 shows a conventional method of performing measurement.

FIG. 6 shows a conventional method of performing measurement.

A UE receives measurement configuration information from a BS (S610). A message including the measurement configuration information is referred to as a measurement configuration message. The UE performs measurement based on the measurement configuration information (S620). If a measurement result satisfies a reporting condition included in the measurement configuration information, the UE reports the measurement result to the BS (S630). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighboring becomes offset better than PCell/PSCell |
| Event A4 | Neighboring becomes better than threshold |
| Event A5 | PCell/PSCell becomes worse than threshold1 and neighboring becomes better than threshold2 |
| Event A6 | Neighboring becomes offset better than SCell |
| Event B1 | Inter RAT neighboring becomes better than threshold |
| Event B2 | PCell becomes worse than threshold1 and inter RAT neighboring becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Hereinafter, event-triggering conditions for measurement reporting are described in detail.

Ten types of event-triggering conditions are defined for measurement reporting (see Table 1), and each event-triggering condition includes an entering condition and a leaving condition. A UE that satisfies an entering condition of an event from a BS may perform measurement reporting to the BS. When the UE performing measurement reporting satisfies a leaving condition of the event, the UE may stop measurement reporting to the BS. Hereinafter, an entering condition and a leaving condition of each event are illustrated.

1. Event A1 (Serving becomes better than threshold)
  (1) Event A1-1 entering condition: Ms−Hys>Thresh
  (2) Event A1-2 leaving condition: Ms+Hys<Thresh
2. Event A2 (Serving becomes worse than threshold)
  (1) Event A2-1 entering condition: Ms+Hys<Thresh
  (2) Event A2-2 leaving condition: Ms−Hys>Thresh A UE triggers an event based on a measurement result Ms of a serving cell. After applying each parameter, event A1 is triggered when the measurement result Ms of the serving cell is better than the threshold of event A1, while event A2 is triggered when the measurement result Ms of the serving cell is worse than the threshold of event A2.

3. Event A3 (Neighboring becomes offset better than PCell/PSCell)
  (1) Event A3-1 entering condition: Mn+Ofn+Ocn−Hys>Mp+Ofp+Ocp+Off
  (2) Event A3-2 leaving condition: Mn+Ofn+Ocn+Hys<Mp+Ofp+Ocp+Off
4. Event A4 (Neighboring becomes better than threshold)
  (1) Event A4-1 entering condition: Mn+Ofn+Ocn−Hys>Thresh
  (2) Event A4-2 leaving condition: Mn+Ofn+Ocn+Hys<Thresh UE triggers an event based on a measurement result Mp of a serving cell and a measurement result Mn of a neighboring cell. After applying each parameter, event A3 is triggered when the measurement result Mn of the neighboring cell is better than the offset of event A3, while event A4 is triggered when the measurement result Mn of the neighboring cell is better than the threshold of event A4.

5. Event A5 (PCell/PSCell becomes worse than threshold1 and neighboring becomes better than threshold2)
    (1) Event A5-1 entering condition: Mp+Hys<Thresh1
    (2) Event A5-2 entering condition: Mn+Ofn+Ocn−Hys>Thresh2
    (3) Event A5-3 leaving condition: Mp−Hys>Thresh1
    (4) Event A5-4 leaving condition: Mn+Ofn+Ocn+Hys<Thresh2

A UE triggers an event based on a measurement result Mp of a PCell/PSCell and a measurement result Mn of a neighboring cell. After applying each parameter, event A5 is triggered when the measurement result Mp of the PCell/PSCell is worse than threshold 1 of event A5 and the measurement result Mn of the neighboring cell is better than threshold 2 of event A5.

6. Event A6 (Neighboring becomes offset better than SCell)
    (1) Event A6-1 entering condition: Mn+Ocn−Hys>Ms+Ocs+Off
    (2) Event A6-2 leaving condition: Mn+Ocn+Hys<Ms+Ocs+Off A UE triggers an event based on a measurement result Ms of a serving cell and a measurement result Mn of a neighboring cell. After applying each parameter, event A6 is triggered when the measurement result Mn of the neighboring cell is better than the offset of event A6.

7. Event B1 (Inter RAT neighboring becomes better than threshold)
    (1) Event B1-1 entering condition: Mn+Ofn−Hys>Thresh
    (2) Event B1-2 leaving condition: Mn+Ofn+Hys<Thresh A UE triggers an event based on a measurement result Mn of a neighboring cell. After applying each parameter, event B1 is triggered when the measurement result Mn of the neighboring cell is better than the threshold of event B 1.

8. Event B2 (PCell becomes worse than threshold1 and inter RAT neighboring becomes better than threshold2)
    (1) Event B2-1 entering condition: Mp+Hys<Thresh1
    (2) Event B2-2 entering condition: Mn+Ofn−Hys>Thresh2
    (3) Event B2-3 leaving condition: Mp−Hys>Thresh1
    (4) Event B2-4 leaving condition: Mn+Ofn+Hys<Thresh2

A UE triggers an event based on a measurement result Mp of a PCell/PSCell and a measurement result Mn of a neighboring cell. After applying each parameter, event B2 is triggered when the measurement result Mp of the PCell/PSCell is worse than threshold 1 of event B2 and the measurement result Mn of the neighboring cell is better than threshold 2 of event B2.

9. Event C1 (CSI-RS resource becomes better than threshold)
    (1) Event C1-1 entering condition: Mcr+Ocr−Hys>Thresh
    (2) Event C1-2 leaving condition: Mcr+Ocr+Hys<Thresh A UE triggers an event based on a CSI-RS measurement result Mcr. After applying each parameter, event C1 is triggered when the CSI-RS measurement result Mcr is better than the threshold of event C1.

10. Event C2 (CSI-RS resource becomes offset better than reference CSI-RS resource)
    (1) Event C2-1 entering condition: Mcr+Ocr−Hys>Mref+Oref+Off
    (2) Event C2-2 leaving condition: Mcr+Ocr+Hys<Mref+Oref+Off A UE triggers an event based on a CSI-RS measurement result Mcr and a measurement result Mref of a reference CSI-RS resource. After applying each parameter, event C2 is triggered when the measurement result Mref of the reference CSI-RS resource is better than the offset of event C2.

Parameters defined for each event are as follows.

Ms is a measurement result of a serving cell, which does not consider any offset.

Mp is a measurement result of a PCell/PSCell, which does not consider any offset.

Mn is a measurement result of a neighboring cell, which does not consider any offset.

Mcr is a measurement result of a CSI-RS resource, which does not consider any offset.

Hys is a hysteresis parameter for each event (that is, a hysteresis defined in a reporting configuration EUTRA (reportConfigEUTRA) for each event).

Ofn is a frequency-specific offset for a frequency of a neighboring cell (that is, an offset frequency defined in a measurement object EUTRA (measObjectEUTRA) corresponding to a frequency of a neighboring cell).

Ocs is a cell-specific offset for a serving cell (that is, a cell individual offset (cellIndividualOffset) defined in a measurement object EUTRA corresponding to a frequency of a serving cell). If no Ocs is set for a serving cell, the offset is set to 0.

Ocn is a cell-specific offset for a neighboring cell (that is, a cell individual offset defined in a measurement object EUTRA corresponding to a frequency of a neighboring cell). If no Ocn is set for a neighboring cell, the offset is set to 0.

Ofp is a frequency-specific offset for a frequency of a PCell/PSCell (that is, an offset frequency defined in a measurement object EUTRA corresponding to a frequency of a PCell/PSCell).

Ocp is a cell-specific offset for a PCell/PSCell (that is, a cell individual offset defined in a measurement object EUTRA corresponding to a frequency of a PCell/PSCell). If no Ocp is set for a PCell/PSCell, the offset is set to 0.

Ocr is a CSI-RS-specific offset (that is, a CSI-RS individual offset (csi-RS-IndividualOffset) defined in a measurement object EUTRA corresponding to a frequency of a CSI-RS resource). If no Ocr is set for a CSI-RS resource, the offset is set to 0.

Mref is a measurement result of a reference CSI-RS resource (that is, a measurement result of a reference CSI-RS resource defined in a reporting configuration EUTRA for event C2), which does not consider any offset.

Oref is a CSI-RS-specific offset for a reference CSI-RS resource (that is, a CSI-RS individual offset defined in a measurement object EUTRA corresponding to a frequency of a reference CSI-RS resource). If no Oref is set for a CSI-RS resource, the offset is set to 0.

Thresh is a threshold parameter for each event (that is, a threshold defined in a reporting configuration EUTRA for each event). Different threshold parameters may be used respectively for events A1 to C2.

Off is an offset parameter for each event (that is, an offset defined in a reporting configuration EUTRA for each event). Different offset parameters may be used respectively for events A3, A6, and C2.

A BS may report or may not report a serving-cell quality threshold (s-Measure). When the BS reports the quality threshold of a serving cell, a UE performs the measurement of a neighboring cell and the evaluation of an event (determining whether an event-triggering condition is satisfied, also referred to as the evaluation of reporting criteria) when the quality (RSRP) of the serving cell is lower than the quality threshold of the serving cell. When the BS does not report the quality threshold of the serving cell, the UE performs the measurement of the neighboring cell and the evaluation of an event without depending on the quality (RSRP) of serving cell.

Hereinafter, Multi-RAT Dual Connectivity (MR-DC) is described.

NG-RAN may support MR-DC operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One node may act as the master node (MN) and the other as the secondary node (SN). The MN and SN may be connected via a network interface and at least the MN is connected to the core network.

Figure 7:
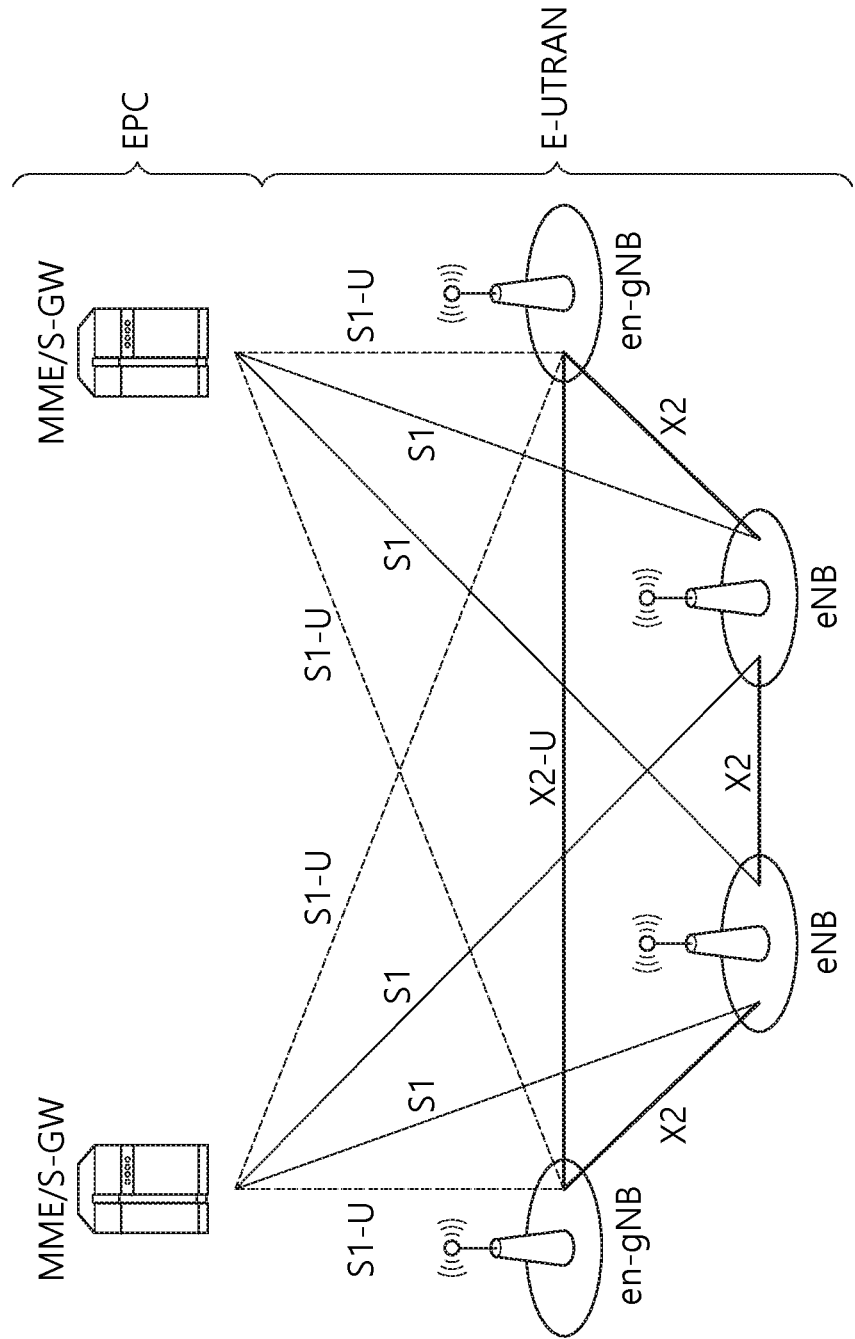
FIG. 7 shows architecture of MR-DC with the EPC.

FIG. 7 shows architecture of MR-DC with the EPC.

E-UTRAN may support MR-DC via E-UTRA-NR Dual Connectivity (EN-DC), in which a UE is connected to one eNB that acts as a MN and one en-gNB that acts as a SN. The eNB may be connected to the EPC via the S1 interface and to the en-gNB via the X2 interface. The en-gNB may also be connected to the EPC via the S1-U interface and other en-gNBs via the X2-U interface.

Furthermore, NG-RAN may support NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface. Furthermore, NG-RAN may support NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

Meanwhile, for radio resource management (RRM) in the EN-DC, the MN is able to trigger intra-SN change, inter-SN change, SN addition and/or SN release. Also, the SN is able to trigger intra-SN change, inter-SN change and/or SN release. In case of the MR-DC, existing event B1 (i.e. Inter RAT neighbour becomes better than threshold) may be used for SN addition triggered by the MN, but it is not suitable for the SN release or SN change triggered by the MN. Namely, in case of the MR-DC, there is no suitable event to support SN release or SN change triggered by the MN. Therefore, in case of the MR-DC, events for supporting SN release or SN change should be defined. Hereinafter, a method for a UE to report a measurement result and an apparatus supporting the same according to an embodiment of the present invention are described in detail.

Hereinafter, the EN-DC scenario will be mainly described for convenience of explanation, but the technical idea of the present invention is not limited thereto. For example, the technical idea of the present invention can also be applied to the NGEN-DC or the NE-DC.

(1) Case 1: SN Addition Triggered by the MN

SN addition procedure can be triggered by the MN. For example, the SN is an NR SN, and the MN is an LTE MN. Then, the UE may need to report NR measurement results to the LTE MN when the SN needs to be added. That is, the LTE measurement report should be triggered, if inter RAT (i.e. NR) neighbour becomes better than threshold.

Above condition is exactly the same with entering condition of event B1 in LTE. This means that the existing event B1 (Inter RAT neighbour becomes better than threshold) may be used for the MN to trigger the SN addition procedure. Similarly, the existing event B1 may be used for the MN to trigger the SN addition procedure in case that the SN is an LTE SN and the MN is an NR MN.

(2) Case 2: SN Release Triggered by the MN

SN release procedure can be triggered by the MN. For example, the SN is an NR SN, the MN is an LTE MN. Then, the UE may need to report NR measurement results to the LTE MN when the SN needs to be released. That is, the LTE measurement report should be triggered, if inter RAT (i.e. NR) neighbour becomes worse than threshold.

Above condition is exactly the same with leaving condition of existing event B1 in LTE. However, event B1 does not support ReportOnLeave which indicates whether or not the UE shall initiate the measurement reporting procedure when the leaving condition is met. In addition, the measurement reporting is not triggered when the leaving condition is met. That is, in LTE, there is no suitable event to support SN release triggered by MN. According to an embodiment of the present invention, the event B1 should be modified to support the ReportOnLeave, in order to enable the MN to trigger the SN release based on the SN radio condition.

(3) Case 3: Inter-SN and/or Intra-SN Change Triggered by the MN

Inter-SN and/or intra-SN change may be triggered by the MN. For example, the SN is an NR SN, the MN is an LTE MN. Then, the UE may need to report NR measurement results to MN when the SN needs to be changed. This means the LTE measurement report should be triggered, if inter RAT (i.e. NR) neighbour becomes better than inter RAT (i.e. NR) SCell. However, there is no such a report event in LTE. That is, in LTE, there is no suitable event to support SN change triggered by the MN. So, if the MN should be able to trigger SN change based on SN radio condition, i.e. by comparing NR SCell and neighbour NR cell, new event should be defined in LTE.

According to an embodiment of the present invention, new event (e.g. inter RAT neighbour becomes better than inter RAT SCell) may be defined. An inter RAT SCell related information may be provided to the UE along with the measurement report event in a report configuration. The UE may receive the report configuration, which includes the inter RAT SCell related information, from the MN. For example, the inter RAT SCell related information may include cell identity (ID) and/or carrier frequency of the cell. For example, the report configuration may be defined as shown in table 2.

TABLE 2

| Event | Inter RAT neighbour becomes better than inter RAT SCell |
|---|---|
| Inter RAT SCell related information | Cell ID = cell B<br>Carrier frequency = frequency C<br>. . . |

If the LTE part of the UE does not consider the NR SCell as a serving cell, the new event should not include SCell' term. In this case, the new event (e.g. inter RAT neighbour becomes better than inter RAT SCell) may be defined as follow:

Inter RAT neighbour becomes better than reference cell. The NR SCell (e.g. inter RAT SCell) may be designated as the reference cell.

According to an embodiment of the present invention, new event (e.g. inter RAT neighbour becomes better than inter RAT SCell, or inter RAT neighbour becomes better than reference cell) may be defined to enable the MN to trigger SN change procedure, based on SN radio condition. In case that all NR SCells is designated as reference cell, the new event may be defined as follow:

Inter RAT neighbour becomes better than one of reference cells, or

Inter RAT neighbour becomes better than the best reference cell, or

Inter RAT neighbour becomes better than the worst reference cell.

A reference cell(s) related information may be provided to the UE along with the measurement report event in a report configuration. For example, the reference cell(s) related information includes cell identity and/or carrier frequency of the cell.

For MN initiated NR to LTE SN change, the UE may need to report when one of the following condition is met:

Event 1: Reference cell becomes worse than threshold1 and neighbour becomes better than threshold2.

In this case, the network may set the reference cell to NR PSCell so that the UE triggers the measurement report, when inter-RAT PSCell becomes worse than threshold1 and neighbour becomes better than threshold2. In a report configuration, reference cell identity (i.e. NR PSCell identity) and/or carrier frequency of the reference cell may be also included along with this event 1. For example, the reference cell identity may be at least one of ECGI or PCI.

Event 2: Inter-RAT reference cell becomes worse than threshold1 and neighbour becomes better than threshold2.

In a report configuration, inter-RAT reference cell identity (i.e. NR PSCell identity) and/or carrier frequency of the inter-RAT reference cell may be also included along with this event 2.

Event 3: Inter-RAT PSCell becomes worse than threshold1 and neighbour becomes better than threshold2.

In a report configuration, inter-RAT PSCell identity (i.e. NR PSCell identity) and/or carrier frequency of the inter-RAT PSCell may be also included along with this event 3.

(4) Case 4: Inter-SN and/or Intra-SN Change Triggered by the SN

Inter-SN and/or intra-SN change may be triggered by the SN. For example, the SN is an NR SN, the MN is an LTE MN. So NR measurement report should be triggered in following cases:

For inter-SN change: Neighbour becomes offset better than PSCell.

For intra-SN change: Neighbour becomes offset better than SCell.

Above conditions are the same with existing event A3 (Neighbour becomes offset better than PCell/PSCell) and event A6 (Neighbour becomes offset better than SCell), respectively. Therefore, existing event A3, and A6 in LTE may be suitable for inter-SN and/or intra-SN change triggered by the SN, and there is no need to define new event or modify existing event for inter-SN and/or intra-SN change triggered by the SN.

(5) Case 5: SN Release Triggered by the SN

SN release may be triggered by the SN. For example, the SN is an NR SN, the MN is an LTE MN. So NR measurement report should be triggered in following cases:

Serving becomes worse than threshold.

Above condition is the same with existing event A2 (Serving becomes worse than threshold). Therefore, existing event A2 in LTE may be suitable for SN release triggered by the SN, and there is no need to define new event or modify existing event for SN release triggered by the SN.

(6) Further Measurement Report Events

In the beginning of the non-standalone (NSA), the NR cell will not be deployed widely so the EN-DC will be used along with LTE DC. This means that if the UE finds better NR cell than LTE SCell during DC operation, it needs to inform PCell of the NR cell. To achieve these, the LTE measurement report for transition from LTE DC to EN-DC should be triggered in following case:

PSCell becomes worse than threshold1 and inter RAT (NR) neighbour becomes better than threshold2.

This is similar with event B2, but the object of current Event B2 is limited to PCell only. According to an embodiment of the present invention, event B2 may be modified as follow:

Event B2 (PCell/PSCell becomes worse than threshold1 and inter RAT (NR) neighbour becomes better than threshold2)

On the contrary, the UE may also need to report when it finds better LTE cell than configured NR SCell during EN-DC. To achieve these, the LTE measurement report for transition from EN-DC to LTE DC should be triggered in following case:

PSCell becomes worse than threshold1 and inter RAT (LTE) neighbour becomes better than threshold2.

This may be the same with the modified event B2. So if transition between LTE DC and EN-DC is supported, event B2 may be modified to be triggered by the PSCell.

Namley, if transition between LTE DC and EN-DC is supported, event B2 may be modified to be triggered by PSCell (i.e. PCell/PSCell becomes worse than threshold1 and inter RAT neighbour becomes better than threshold2).

Figure 8:
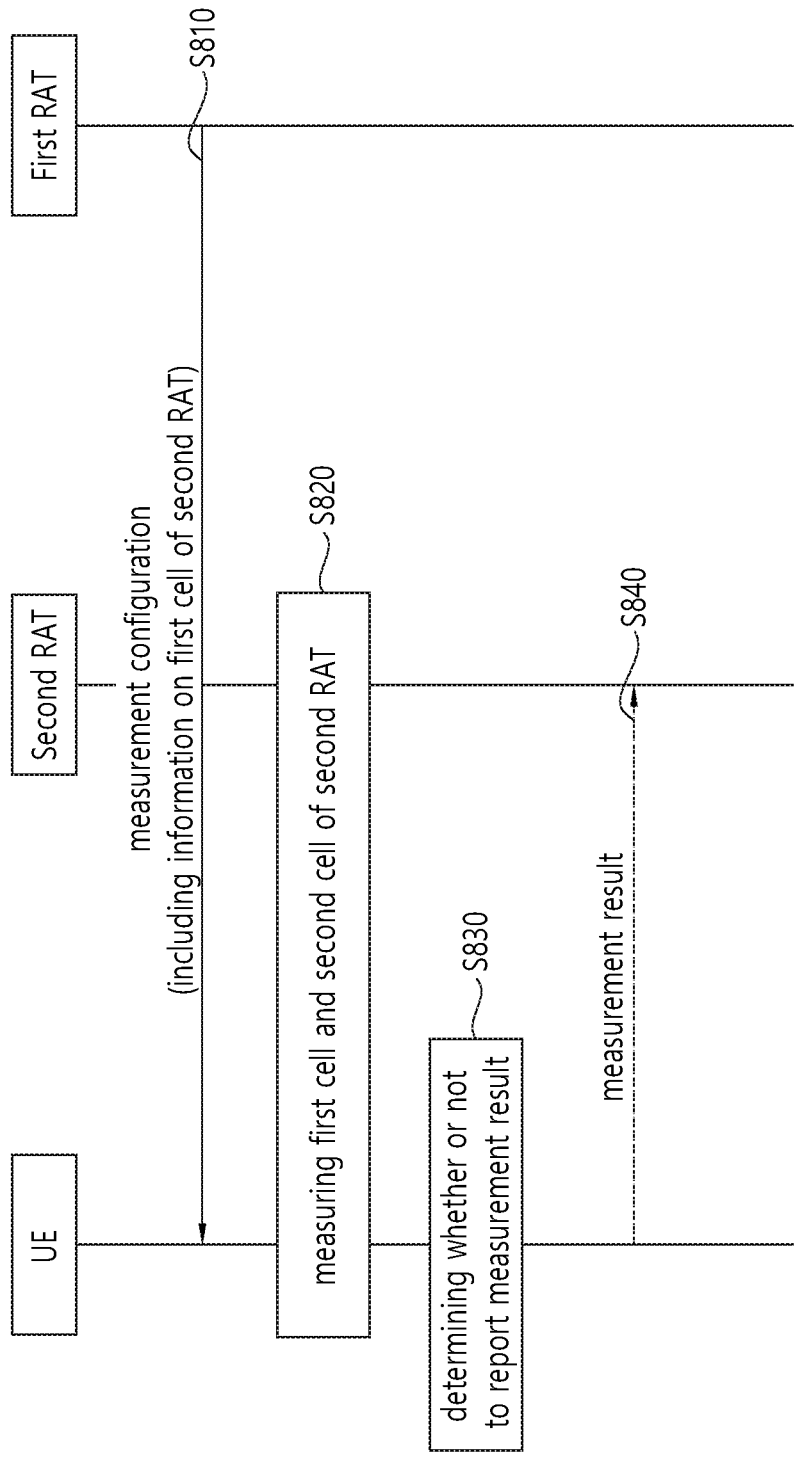
FIG. 8 shows a measurement reporting procedure according to an embodiment of the present invention.

FIG. 8 shows a measurement reporting procedure according to an embodiment of the present invention.

According to an embodiment of the present invention, the measurement reporting procedure is triggered for SN changing by the MN. A radio access technology supported by the MN may be different from a radio access technology supported by the SN. For example, the MN may be an LTE base station, and the SN may an NR base station. Alternatively, for example, the MN may be an NR base station, and the SN may be an LTE base station.

Referring to FIG. 8, in step S810, the UE may receive measurement configuration including information on a first cell of a second RAT, from a first base station of a first radio access technology (RAT). The information on the first cell of the second RAT may include at least one of identifier of the first cell or carrier frequency of the first cell.

The UE may be connected with the first base station of the first RAT as a master node (MN), and the UE may be connected with a second base station of the second RAT as a secondary node (SN). The first RAT and the second RAT may be different radio access technology. For instance, the first RAT may be a LTE system, and the second RAT may be an NR system. For instance, the first RAT may be an NR system, and the second RAT may be a LTE system.

The master node may trigger to change the first cell of the secondary node, by transmitting the measurement configuration including information on the first cell of the second RAT to the UE.

In step S820, the UE may measure the first cell and a second cell of the second RAT, based on the received measurement configuration from the first base station of the first RAT. The second cell may be a neighbour cell of the first cell. The first cell may be a current secondary cell (SCell).

In step S830, the UE may determine whether or not to report the measurement result, based on the measurement result of the first cell and second cell of second RAT.

The UE may determine to report the measurement result, if the first cell becomes worse than a first threshold and the second cell becomes better than a second threshold. The first threshold and the second threshold may be configured by the first base station of the first RAT.

The UE may determine to report the measurement result, if the second cell becomes better than the first cell.

In step S840, the UE may report the measurement result, to the first base station of the first RAT. The measurement result may include at least one of a result of the measured first cell or a result of the measured second cell. The result of the measured first cell may be at least one of reference signal received power (RSRP), reference signal received quality (RSRQ) or reference signal-signal to interference and noise ratio (RS-SINR) of the first cell, and the result of the measured second cell may be at least one of RSRP, RSRQ or RS-SINR of the second cell.

According to an embodiment of the present invention, new event for triggering SN change may be defined, and MN may trigger SN change procedure to change current SCell. That is, in case of EN-DC or NE-DC, the MN can trigger to change a current SCell or a reference cell of the SN which belongs to another RAT. Then, the current SCell or the reference cell may be changed to neighbor cell, based on the measurement report.

Figure 9:
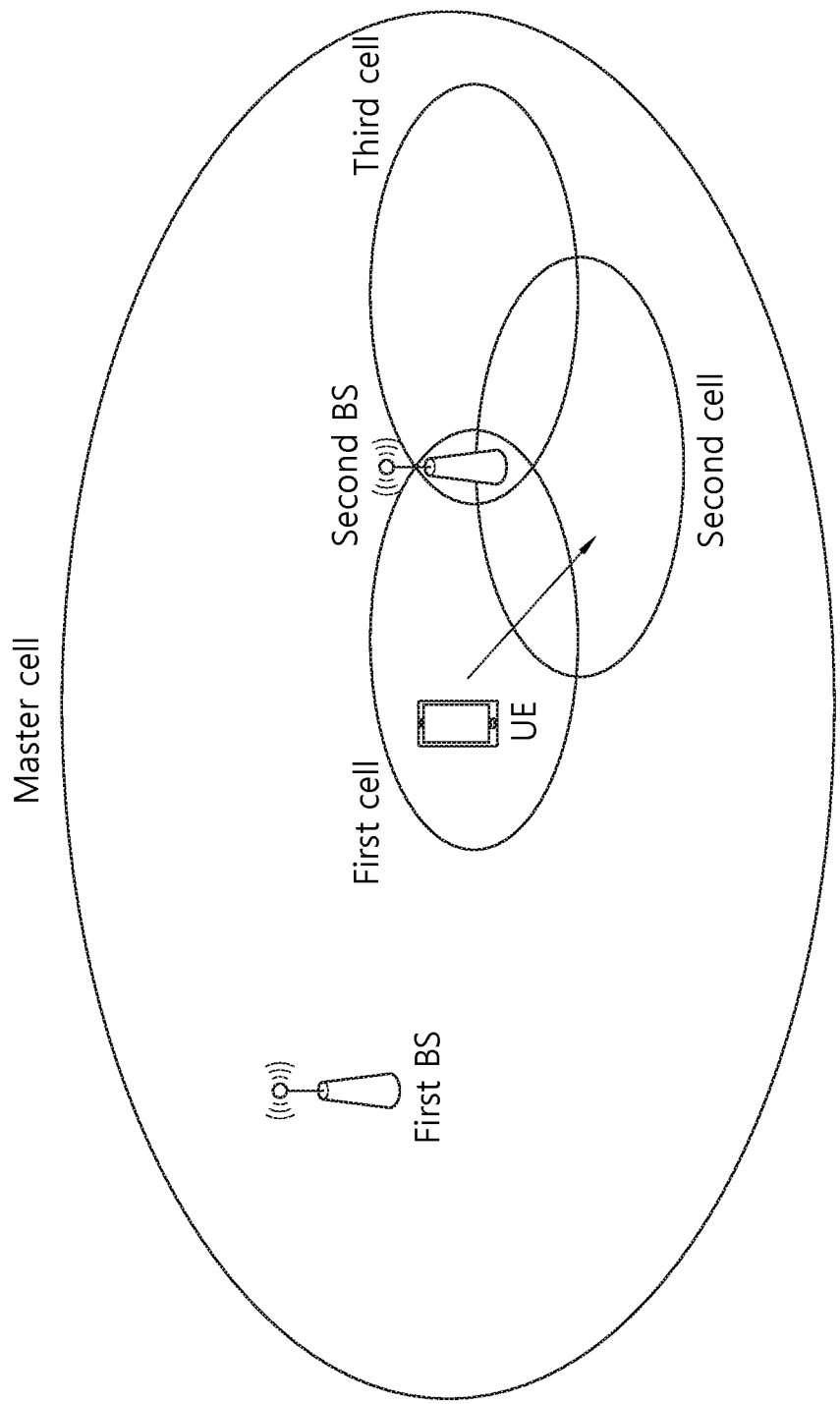
FIG. 9 shows a drawing to explain SCell change procedure according to an embodiment of the present invention.

FIG. 9 shows a drawing to explain SCell change procedure according to an embodiment of the present invention.

Referring to FIG. 9, the UE has dual connectivity with first BS of first RAT and second BS of second RAT. It is assumed that the master cell is a PCell and the first cell is a SCell. The first RAT and the second RAT may be different radio access technology. For instance, the first RAT may be a LTE system, and the second RAT may be an NR system. For instance, the first RAT may be an NR system, and the second RAT may be a LTE system.

If the UE is moving from the first cell to the second cell, the UE may receive measurement configuration including information on the first cell from the first base station. That is, a SCell change procedure may be triggered by the first BS which belongs to another RAT, by transmitting the measurement configuration including information on the first cell. Then, the UE may measure the first cell and the second cell in order to change a current SCell (i.e. first cell), based on the received measurement configuration from the first base station.

If the first cell becomes worse than a first threshold and the second cell becomes better than a second threshold, the UE may determine to report the measurement result, and report the measurement result to the first base station. The measurement result may include at least one of a result of the measured first cell or a result of the measured second cell. After then, the SCell may be changed from the current SCell (i.e. first cell) to the second cell, based on the reported measurement result.

Figure 10:
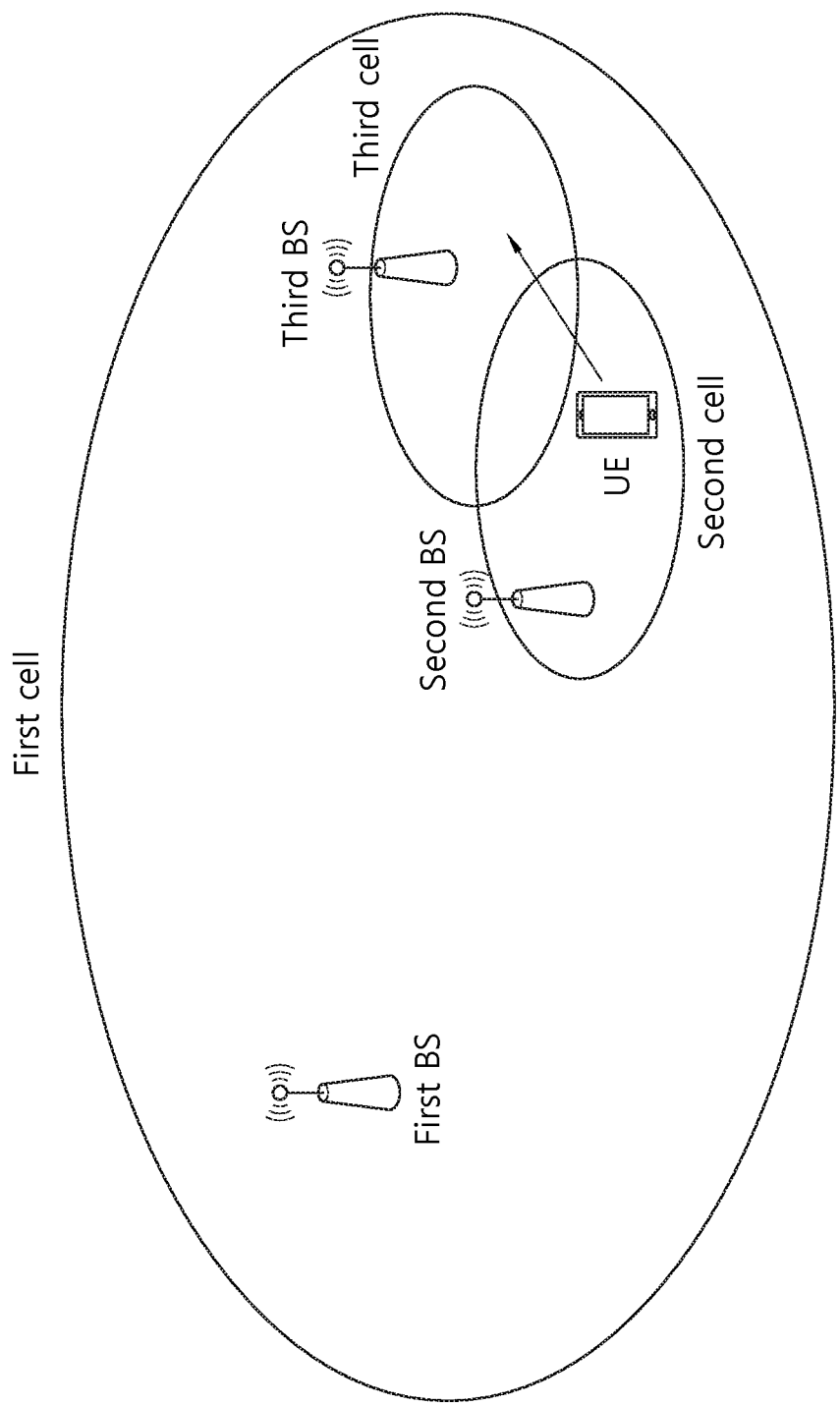
FIG. 10 shows a drawing to explain secondary node (SN) change procedure according to an embodiment of the present invention.

FIG. 10 shows a drawing to explain secondary node (SN) change procedure according to an embodiment of the present invention.

Referring to FIG. 10, the UE has dual connectivity with first BS of first RAT and second BS of second RAT. It is assumed that the second BS and the third BS have the same radio access technology. For instance, the first RAT may be a LTE system, and the second RAT may be an NR system. For instance, the first RAT may be an NR system, and the second RAT may be a LTE system.

If the UE is moving from the second cell to the third cell, the UE may receive measurement configuration including information on the second cell from the first base station. That is, a secondary node change procedure may be triggered by the first BS which belongs to another RAT, by transmitting the measurement configuration including information on the second cell. Then, the UE may measure the second cell and the third cell in order to change a current secondary node (i.e. second base station), based on the received measurement configuration from the first base station.

If the second cell becomes worse than a first threshold and the third cell becomes better than a second threshold, the UE may determine to report the measurement result, and report the measurement result to the first base station. The measurement result may include at least one of a result of the measured second cell or a result of the measured third cell. After then, the secondary node may be changed from the current secondary node (i.e. second base station) to the third base station, based on the reported measurement result.

Figure 11:
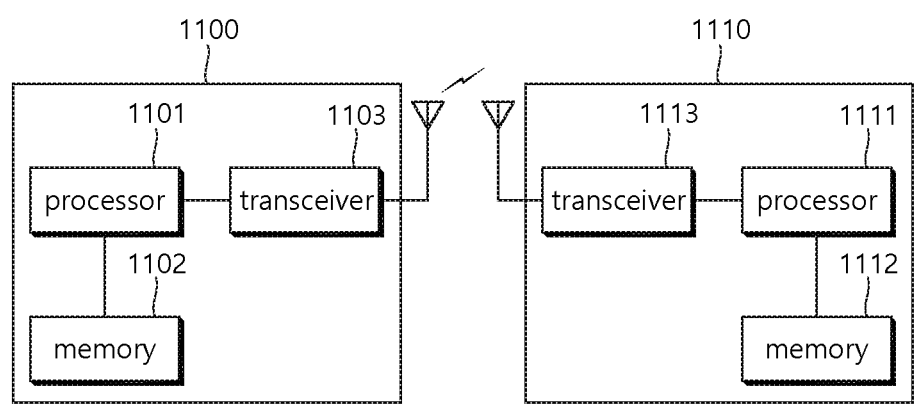
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the user equipment may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for reporting, by a user equipment (UE), a measurement result in a wireless communication, the method comprising:
   receiving measurement configuration including information regarding a first cell of a second RAT, from a first base station of a first radio access technology (RAT);
   measuring the first cell and a second cell of the second RAT, based on the received measurement configuration from the first base station of the first RAT;
   determining whether or not to report the measurement result, based on the measurement result of the first cell and second cell of second RAT; and
   reporting the measurement result, to the first base station of the first RAT,
   wherein the UE is connected with the first base station of the first RAT as a master node, and the UE is connected with a second base station of the second RAT as a secondary node.

2. The method of claim 1, wherein the first RAT and the second RAT are different radio access technology.

3. The method of claim 1, wherein the first RAT is a LTE system, and the second RAT is an NR system.

4. The method of claim 1, wherein the first RAT is an NR system, and the second RAT is a LTE system.

5. The method of claim 1, wherein the second cell is a neighbour cell of the first cell.

6. The method of claim 5, wherein the first cell is a secondary cell (SCell).

7. The method of claim 1, wherein the information regarding the first cell of the second RAT includes at least one of identifier of the first cell or carrier frequency of the first cell.

8. The method of claim 1, wherein the measurement result includes at least one of a result of the measured first cell or a result of the measured second cell.

9. The method of claim 8, wherein the result of the measured first cell is at least one of reference signal received power (RSRP), reference signal received quality (RSRQ) or reference signal-signal to interference and noise ratio (RS-SINK) of the first cell, and
   wherein the result of the measured second cell is at least one of RSRP, RSRQ or RS-SINR of the second cell.

10. The method of claim 1, wherein the UE determines to report the measurement result, based on the first cell becoming worse than a first threshold and the second cell becoming better than a second threshold.

11. The method of claim 10, wherein the first threshold and the second threshold are configured by the first base station of the first RAT.

12. The method of claim 1, wherein the UE determines to report the measurement result, based on the second cell becoming better than the first cell.

13. The method of claim 1, wherein the master node triggers to change the first cell of the secondary node, by transmitting the measurement configuration including the information regarding the first cell of the second RAT to the UE.

14. The method of claim 1, wherein the UE is further configured to communicate with at least one of a mobile terminal, a network, or autonomous vehicles other than the UE.

15. A user equipment (UE) configured to report a measurement result in a wireless communication, the UE comprising:
   a memory; a transceiver; and
   a processor, connected to the memory and the transceiver, that, based on executing instructions stored in the memory, control the UE to:
   receive measurement configuration including information regarding a first cell of a second RAT, from a first base station of a first radio access technology (RAT);
   measure the first cell and a second cell of the second RAT, based on the received measurement configuration from the first base station of the first RAT;
   determine whether or not to report the measurement result, based on the measurement result of the first cell and second cell of second RAT; and
   report the measurement result, to the first base station of the first RAT,
   wherein the UE is connected with the first base station of the first RAT as a master node, and the UE is connected with a second base station of the second RAT as a secondary node.

* * * * *